Dec. 14, 1926.
M. C. BLONDIN
1,610,737
DOUBLE PIVOTED FOLDING MIRROR CHIEFLY FOR USE AS POCKET OR HAND BAG MIRRORS
Filed Jan. 5, 1926
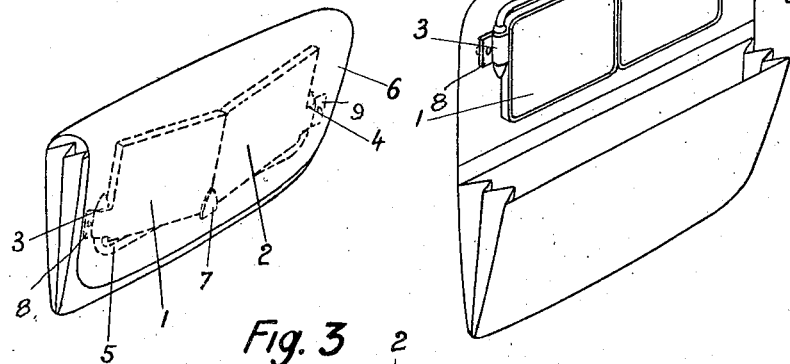
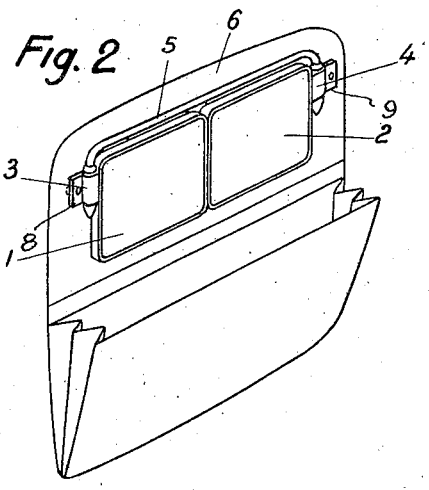
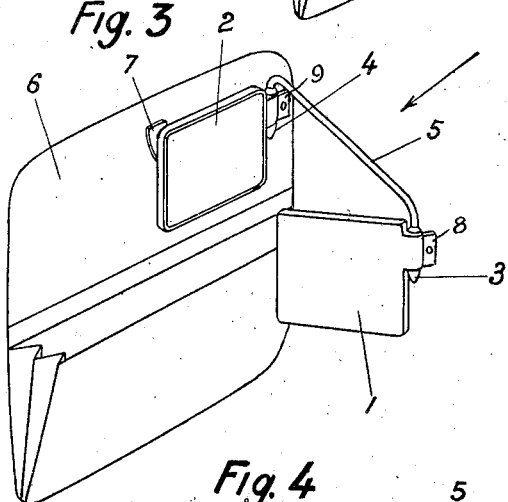
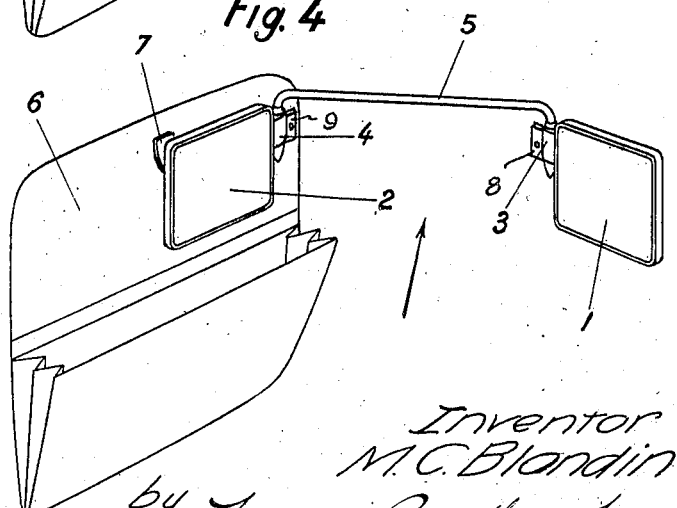

Patented Dec. 14, 1926.

1,610,737

UNITED STATES PATENT OFFICE.

MICHEL CHARLES BLONDIN, OF MEUDON, FRANCE.

DOUBLE-PIVOTED FOLDING MIRROR CHIEFLY FOR USE AS POCKET OR HAND-BAG MIRRORS.

Application filed January 5, 1926, Serial No. 79,480, and in France January 9, 1925.

My invention has for its object a double pivoted mirror adapted for use as a pocket mirror or as a lady's handbag mirror.

It comprises two looking-glasses connected by an arm both ends of which are bent so as to provide parallel projections to which the two glasses are hinged whereby the folded glasses show their front reflecting side instead of their back as is the usual case with ordinary two and three-side folding mirrors. The glasses do not besides fold over each other and hide each other more or less as in these usual mirrors, but on the contrary are in one same plane in continuation one of the other whereby they appear practically when folded as one same mirror having a minimum thickness and having a shape and size similar to those of the ordinary handbag mirrors, the entire surface of both glasses being adapted to be used as a whole as if it were an ordinary looking glass in one part. This result is achieved by giving the arm uniting the glasses a length equal to double the width of each glass. The middle joint separating the two glasses when these are folded is practically negligible and does not hinder at all because both eyes are used for looking and the images they provide complete each other.

The two mirrors can be immobilized in this folded position wherein they can be accurately fixed by any suitable stop device comprising if desired springs or catches and disposed in a suitable part of the mirrors or of their support. This stop device can be disposed when used with handbags, so as to provide for a slight angle between the two folded glasses whereby these will be better adapted to the swollen shape shown by full handbags when they are closed. This arrangement has the advantage of preventing to some extent the flap of the bag to which the mirror is secured from being deformed. The stop device can besides, in this case, be completed by a suitable spring urging the two mirrors back into the same plane as soon as the bag is opened, without any further handling.

The arrangement can be used as a two-side mirror either alone or secured to a suitable supporting part such as a handbag, in which latter case the mounting is provided for by securing one of the glasses by its back or its hinged edge to a side of the bag. This allows any suitable angular displacements to be given to the connecting arm and to the other glass whereby it is possible to obtain one's own side view. It is possible in fact to obtain not only one series of positions for the two glasses as in the usual two-side mirrors, but two series of distinct positions corresponding to the two different manners of holding the glasses with reference to the connecting arm i. e. in front of it or at its rear with reference to the observer. Assuming that for each manner of holding the glasses the optimum position is the one where the mirrors are perpendicular to each other and symmetrically disposed with reference to the connecting arm, two most advantageous positions can be obtained in one of which the glasses are spaced by about double their spacing in the other position. The first of these allows a side view and a front three-quarter view and the second a side view and a rear three-quarter view to be obtained. This arrangement provides therefore with glasses of the same size a greater field of view than is possible with the ordinary mountings.

The glasses, their mounting or the hinges can be provided with any suitable stop devices, such as catches or slides corresponding to these optimum positions in order to allow the glasses to be put in place immediately without any hesitation.

A form of execution of my invention as used with a handbag is shown, by way of example, on appended drawings whereof:

Fig. 1 shows the bag closed with the mirror behind the flap shown in dotted lines;

Fig. 2 is a view of the bag open, the glasses being shown used as a mirror.

Figs. 3 and 4 are perspective views of the device unfolded and set in the two optimum positions referred to hereinabove.

The glasses 1 and 2 are pivotally secured at 3 and 4 to the two ends of the connecting arm 5 and are mounted in such a manner that when they are folded (Figs. 1 and 2) they are in alignment one with the other and show their reflecting side to a person opening the bag (Fig. 2). In the example shown, the glass 2 is secured by its back to the flap of the bag 6.

A stop device 7 secured to the glass 2 allows the glass 1 to be stopped in a position where it is in alignment with the glass 2. Thus when the mirror is to be used as a single mirror in one part, it is sufficient to push the glass 1 until it comes against the stop 7. In the example shown the stop is disposed in a manner such that when the bag is closed (Fig. 1) the two glasses instead of being in alignment are allowed to be slightly angularly displaced one with reference to the other.

Of course this stop device is only shown by way of example and can be executed in a great number of different manners. For instance it can comprise a spring urging automatically the glass 1 into the plane of the glass 2 and in alignment therewith as soon as the glass 1 comes near the glass 2. This stop device can also secure the two glasses by means of a catch in the position where they are in alignment one with reference to the other.

The Figs. 3 and 4 show in perspective view the optimum position for the unfolded glasses for each manner of holding the mirror. Fig. 3 is a view wherein the observer is supposed to be looking in the direction of the arrow, the connecting arm 5 being in front of the two glasses whereas it is at the rear of these in the position shown on Fig. 4. In the latter case the distance between the mirrors is about double that between them in the first case.

Evidently the device can be executed in a number of different manners according to the shape or setting of the glasses, of the mounting of the hinges and of the stop devices. For instance the hinges can be provided with play compensating devices such as split bearings which allow the pivoting part to be slightly tightened either by their natural elasticity or by means of screws, 8, 9 or other adjusting arrangements. This play compensating device is of great advantage in my invention because it allows the glasses and the connecting arm to stop in the position given to them, even if no stop device is used. Otherwise the weight of the several parts might make them move whilst the observer moves so as to see himself sideways.

What I claim is:

1. A double pivoted mirror, comprising two glasses, parallel hinges disposed respectively on each glass, a connecting arm perpendicular to said hinges and ending with projections forming the pivoting part of said hinges, the length of the connecting arm being equal to the sum of the breadth of the two glasses in the direction perpendicular to the hinges, and stop devices adapted to keep the glasses in predetermined positions.

2. A double pivoted mirror, comprising two glasses, parallel hinges disposed respectively on each glass, means for compensating the play of the hinges, a connecting arm perpendicular to said hinges and ending with projections forming the pivoting part of said hinges, the length of the connecting arm being equal to the sum of the breadth of the two glasses in the direction perpendicular to the hinges, and stop devices adapted to keep the glasses in predetermined positions.

In testimony whereof I have signed my name to this specification.

MICHEL CHARLES BLONDIN.